UNITED STATES PATENT OFFICE.

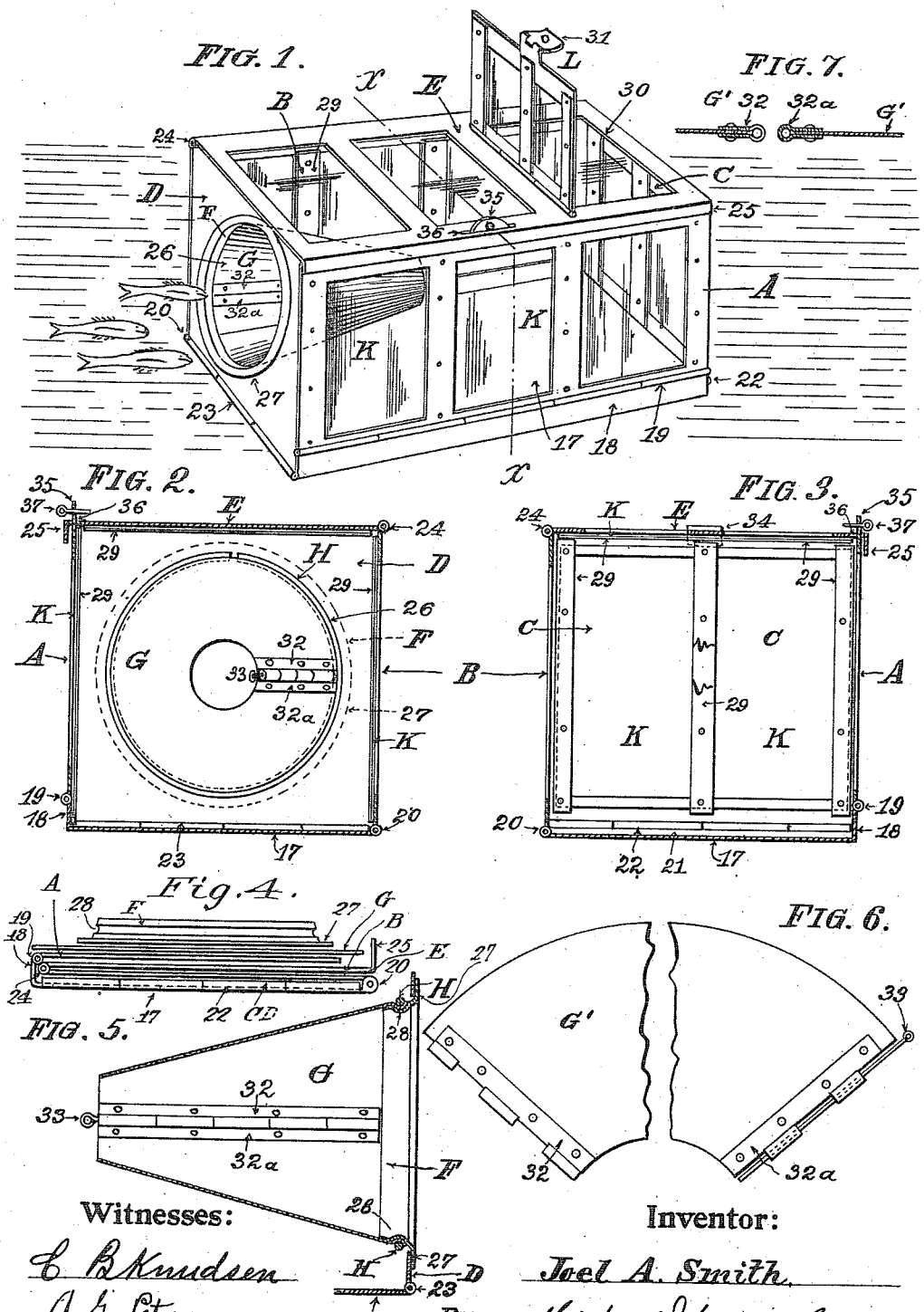

JOEL A. SMITH, OF CHICAGO, ILLINOIS.

TRANSPARENT KNOCKDOWN MINNOW-TRAP.

985,949.  Specification of Letters Patent.  Patented Mar. 7, 1911.

Application filed September 19, 1910. Serial No. 582,670.

*To all whom it may concern:*

Be it known that I, JOEL A. SMITH, a citizen of the United States, and resident of Chicago, in the county of Cook and State of Illinois, have invented certain new and useful Improvements in Transparent Knockdown Minnow-Traps; and I do hereby declare that the following description of my said invention, taken in connection with the accompanying sheet of drawings, forms a full, clear, and exact specification, which will enable others skilled in the art to which it appertains to make and use the same.

This invention has general reference to improvements in minnow traps; and it consists, essentially, in the novel and peculiar combination of parts and details of construction, as hereinafter first fully set forth and described, and then pointed out in the claims.

In the drawings already mentioned, which serve to illustrate this invention more fully, Figure 1 is a perspective view of this improved minnow trap. Fig. 2 is a transverse sectional elevation on line $x\ x$ of Fig. 1, looking toward the ingress end of the trap. Fig. 3 is a like view looking toward the back end thereof. Fig. 4 is an end view showing the trap in knocked-down condition. Fig. 5 is a sectional view of the ingress cone detached. Fig. 6 is a plan of the same when flattened out. Fig. 7 is a sectional view of a fragment of the cone, illustrating the means for securing the abutting edges of the cone when required for use in the trap.

Like parts are designated by corresponding symbols and characters of reference in all the figures.

The object of this invention is the production of a minnow trap that is readily knocked down for transportation, and put together when wanted for use. It shall also possess all the advantages of a transparent trap without the disadvantages of bulk and liability to breakage of a glass trap.

This minnow trap is of rectangular construction and it comprises a, preferably solid, bottom 17, made from sheet metal, one longitudinal edge of which is upturned at 18, and formed to a hinge-member 19, to which one side member A, of the trap is hingedly connected. The opposite longitudinal edge of the bottom 17 is also formed to a hinge-member 20, to which the oppositely located side member B, is hingedly connected. One end of the bottom 17 is slightly upwardly turned at 21, Fig. 3, and formed to a hinge member 22, to which the rear wall C, of the trap is hingedly connected, while the opposite end of the bottom 17 is turned to a hinge member 23, to which the front wall D, of the trap is hinged.

To the upper edge of the side wall B, which is rolled to form a hinge member 24, there is hinged a cover E, which cover has its upper longitudinal edge downwardly turned at 25, to overlap the side member A when the trap is in assembled operative condition. In the forward wall D there is a large round opening 26, in which there is removably located a flanged ring F, to which is removably affixed, a cone G, at its large end, which cone forms the entrance passage to the interior of the trap. In this ring F there is, close behind the flange 27 thereof, a groove 28, which is adapted to receive a resilient split ring or band H, by means of which the ring F, and with it the cone G, is removably held in position. In the two side members, the rear member, and the cover, there are large openings which are closed by sheets of transparent material K, preferably celluloid, owing to its lightness and flexibility, though thin glass may be advantageously employed if desired, which transparent material is held in position by metallic strips 29, riveted or otherwise secured to the respective walls of the trap. The rear opening 30, of the cover E is fitted with a, preferably hinged, lid L, which lid has a suitable catch 31, adapted to retain the lid L in normally closed condition.

The cone G is, preferably, made from celluloid or similar transparent and flexible material which can be formed from a blank, such as is illustrated in Fig. 6, at G′, whereby said blank may be readily rolled to the cone-shaped contour, and in order that it may be retained in this cone-shape, I locate on both of its outer converging edges interlocking members 32, 32ᵃ, shown in detail in Figs. 6 and 7, through which a rod 33, is passed to hold the abutting ends of the cone G together in operative condition.

To dismount this trap, the cover E with its lid L in closed condition, is turned back and down upon the side member B. Then the cone G is removed from the trap by removing the split ring H to permit of the withdrawal of the flanged ring F from the front wall D, after which the end members C, D, are folded down upon the bottom 17. Now the side member B with the turned-down cover E is folded upon the end members C, D, and then the side member A turned down upon the cover E, the hinges 19 on the upwardly-projecting portion 18 of the bottom 17 being sufficiently above the bottom 17 to permit the side member A to overlie the end members C, D, the side member B, and the cover E. The cone G may now be flattened out by withdrawing the locking pin 33 from the interlocking members 32, 32ᵃ, and placed upon the cover E, and finally the flanged ring F with the split ring H in the groove 28, located upon the flattened out cone G. In this dismounted condition the trap occupies a space equal to the length and width of the trap, but only very little space in height, so that it may be readily packed in a suit-case, traveling bag, or other package, while its reassembling when required, which is the reverse of the operation of dismounting heretofore described, may be accomplished in a very short time.

In use the trap is baited in the usual manner and then placed in water where minnows abound when the minnows will enter the trap through the cone G to reach the bait. When a minnow is desired for baiting a fish-hook, the lid L is opened, which lid is of sufficient size to permit a hand being inserted into the trap to remove the minnow. The bait in the trap, and also minnows already caught, can be easily seen from the outside of the trap through the transparent members of the walls thereof, thus serving as a decoy to lure other minnows into the trap.

While I prefer to locate the lid L in the cover E for the sake of convenience in reaching the interior thereof, I may dispense with this lid L and remove captured minnows from the trap by swinging down the rear end member C, which for this purpose may be provided with a catch 34, adapted to overreach the cover E, as indicated in Fig. 3. To lock this cover E in assembled condition, I prefer to form on the side member A an upwardly projecting lug 35, which passes through a properly located slot 36, in the cover E, said lug being punctured to receive a bar, pin, or other suitable object 37, to lock the cover temporarily in assembled condition.

I have hereinbefore described the preferred embodiment of my invention, but I desire it understood that changes in the details of construction which will readily suggest themselves to a person skilled in the art to which this invention appertains may be made, without departing from the scope of my said invention.

I prefer to make the trap of a length approximately twice that of its height so that when the end members C, D, are turned down, one will not overlap the other, thereby saving space when the trap is disassembled.

Having thus fully described this invention, I claim as new and desire to secure to me by Letters Patent of the United States—

1. A transparent knock-down minnow trap comprising two side members, two end members, a cover, and a bottom, said side and end members being hingedly connected to said bottom, and the cover hingedly connected to one of said side members, there being in one of the end members a large circular opening, a flanged ring in said opening and removable therefrom, a split ring adapted to engage said flanged ring, and a cone removably attached to said flanged ring and retained in assembled condition by said split ring, said cone being made from transparent, flexible, material, its ends being provided with metallic bindings, said bindings being constructed for separable connection with each other, whereby in knocking down, the cone can be flattened out, as specified.

2. A transparent knock-down minnow trap, comprising a bottom, two side members hingedly connected to said bottom, a cover hingedly connected to one of said side members; a catch adapted to lock said cover in assembled condition; two end members hingedly connected to said bottom, there being in one of said end members a large circular opening; a flanged ring in, and removable from, said opening; a split ring adapted to engage said flanged ring on the inner side of said front member, and a cone removably attached to said flanged ring and held thereto by said split ring, said cone being capable of being flattened when disconnected from said flanged ring, said cone being provided with means for securing the abutting ends one to the other, said means including interlocking members.

3. In a fish trap, a receptacle having an end member, there being in said end member a large, circular, opening, a transparent, flexible, entering-cone, said cone having the contour of a segment of a circle, there being at the converging edges metallic members constructed to interlock, an annular ring engaging said opening in the end member, said ring having a laterally projecting flange constructed to engage the outer surface of said end member, and a circumferential groove in its periphery located at the inner side of said end member, and a split ring constructed to connect said cone to said ring and said ring to said end member.

In testimony that I claim the foregoing as my invention, I have hereunto set my hand in the presence of two subscribing witnesses.

JOEL A. SMITH.

Witnesses:
MICHAEL J. STARK,
RALPH BASSLER.

Copies of this patent may be obtained for five cents each, by addressing the "Commissioner of Patents, Washington, D. C."